United States Patent [19]

Suzuki et al.

[11] Patent Number: 5,605,751
[45] Date of Patent: Feb. 25, 1997

[54] LAMINATES

[75] Inventors: Fukuji Suzuki; Tsutomu Saito, both of Kanagawa; Nobuhisa Tsujita, Tokyo; Yoshimi Kanada, Tokyo; Kazumi Saito, Tokyo; Toshiaki Ougiya, Tokyo, all of Japan

[73] Assignees: Shiseido Company, Ltd.; Figla Co., Ltd., both of Tokyo, Japan

[21] Appl. No.: 425,243

[22] Filed: Apr. 17, 1995

Related U.S. Application Data

[63] Continuation of Ser. No. 117,068, filed as PCT/JP93/00003, Jan. 6, 1993, published as WO93/13939, Jul. 22, 1993, abandoned.

[30] Foreign Application Priority Data

| Jan. 6, 1992 | [JP] | Japan | 4-018155 |
| Jan. 6, 1992 | [JP] | Japan | 4-018156 |
| Sep. 21, 1992 | [JP] | Japan | 4-274803 |
| Sep. 21, 1992 | [JP] | Japan | 4-274804 |
| Oct. 6, 1992 | [JP] | Japan | 4-290894 |
| Oct. 6, 1992 | [JP] | Japan | 4-290895 |

[51] Int. Cl.⁶ .................................................. B32B 9/00
[52] U.S. Cl. ....................... 428/323; 428/324; 428/325; 428/327; 428/426; 428/46
[58] Field of Search ................................ 106/417, 415, 106/400; 359/63; 428/324, 426, 689, 688, 690, 403, 204, 337, 46, 325, 327

[56] References Cited

U.S. PATENT DOCUMENTS

| 4,268,127 | 5/1981 | Oshima | 359/63 |
| 4,415,509 | 11/1983 | Toyooka | 428/338 |
| 4,539,258 | 9/1985 | Panush | 428/324 |
| 4,623,396 | 11/1986 | Kimura | 106/417 |
| 4,729,067 | 3/1988 | Ole | 350/321 |

OTHER PUBLICATIONS

Encyclopedia of Polymer Science, Wiley & Sons, pp. 547–548, 566–568 (1985).

*Primary Examiner*—Patrick Ryan
*Assistant Examiner*—Patrick Jewik
*Attorney, Agent, or Firm*—Koda and Androlia

[57] ABSTRACT

The present invention provides fundamental materials excellent in general purpose used for buildings, etc. as windows and interior and exterior walls of general buildings, houses, cars, etc., concretely, various laminates with the flip-flop effect (the effect of delicately changing in color, depending on the angles of view) and a decorative effect due to a colored mirror face, which are composed at least of a light-transmitting or light-intercepting base and a brightening pigment prepared by covering mica grains on the surfaces with titanium oxides including low-valent titanium oxides.

1 Claim, 10 Drawing Sheets

LAMINATES

This is a continuation of application Ser. No. 08/117,068, filed Sep. 3, 1993, now abandoned, which is a 371 of PCT/JP93/00003, filed Jan. 6, 1993.

BACKGROUND OF THE INVENTION

1. Technical Field

The present invention relates to fundamental materials excellent in general purpose as used for buildings, which can be used as windows and interior and exterior walls of general buildings, houses, cars, etc. In more detail, it relates to laminates composed of a light-transmitting or light-intercepting base and a layer containing a brightening pigment prepared by covering mica grains on their surfaces with titanium oxides including low-valent titanium oxides (hereinafter simply called a brightening pigment).

2. Prior Arts and Their Problems

Conventional structures of iron, wood, concrete, etc. used internally and externally for general buildings are painted or covered with wall paper, etc. to hide the rough surfaces of the materials, for presenting decorative colors and imitative patterns, and furthermore in order to hide exposed parts, etc., tiles with colors or symbolic or imitative patterns or decorative flat panels are used to cover them. Furthermore, building materials like glass used for windows, interior and exterior wall panels, and parts of furniture also use colored and patterned glass and other sheets for decoration.

However, these decorative means which use conventional pigments, dyes, etc. as coloring ingredients do not vary in color and rather tend to give priority to the functional aspect of the structures peculiar to the raw materials. So, they rather poorly contribute to decoration.

SUMMARY OF THE INVENTION

The first object of the present invention is, in view of said problem of the prior arts, to provide highly decorative laminates with the flip-flop effect (the effect that color changes delicately, depending on the angles of observation).

The laminates of the present invention use a brightening pigment prepared by covering mica grains on the surfaces with titanium oxides including low-valent titanium oxides to give the flip-flop effect. The brightening pigment is a mica titanium based pigment disclosed in Japanese Patent Publication No. 84-126468 and Japanese Patent Laid-Open No. 85-60163. As shown in the view illustrating the principle in FIG. 23, each mica grain $8a$ is covered on its surface with layers $8b$, $8c$ and $8d$ of titanium oxides including low-valent titanium oxides, to form a chemically stable pigment. In detail, a flake-like mica grain $8a$ is at first covered on the surface with titanium dioxide to form a first titanium dioxide layer $8b$, and the first titanium dioxide layer $8b$ is reduced for covering with a low-valent titanium oxide layer $8c$. Furthermore, the low-valent titanium oxide layer $8c$ is covered with titanium dioxide, to form a second titanium dioxide layer $8d$, thus forming a three-layer covering around the mica grain $8a$. In this structure, the light reflected from the surface of the brightening pigment grain and the light with a specific wavelength reflected from the interface between the white and black titanium oxide layers $8b$ and $8c$ and the mica grain $8a$ are mutually intensified at the same phase in the interference action of light, for coloring.

If light falls on the pigment, part of the incident light is reflected on the surface of the second titanium dioxide layer $8d$, and the remaining incident light is transmitted by the second titanium dioxide layer $8d$, the low-valent titanium oxide layer $8c$ and the first titanium dioxide layer $8b$ respectively, to be reflected from the surface of the mica grain $8a$, being transmitted again by the first titanium dioxide layer $8b$, the low-valent titanium oxide layer $8c$ and the second titanium dioxide layer $8d$ respectively. Thus, the light reflected from the second titanium dioxide layer $8d$ and the light reflected from the mica grain $8a$ interfere with each other at the same phase, for coloring.

Therefore, without using any other color pigment which degrades the pigment properties, the pigment allows various colors to be created by adjusting the thicknesses of the respective titanium oxide layers $8b$, $8c$ and $8d$. Furthermore, since the grains are like flakes, gloss like soap bubbles and butterfly alae can be obtained, and depending on the angle of incident light, the first titanium dioxide layer $8b$, the low-valent titanium oxide layer $8c$ and the second titanium dioxide layer $8d$ vary in the light-transmitting layer thickness, to provide the flip-flop effect of causing the color to be changed depending on the angle of observation.

Moreover, the brightening pigment has a layer structure to more effectively provide the interference light with a specific wavelength as the cause of coloring. This is attributable to the existence of the first titanium dioxide layers $8b$ and the selectively absorbing black low-valent titanium oxide layers $8c$ above and below the mica grain $8a$ as shown in FIG. 24. In a pigment with a structure free from the low-valent titanium oxide layers $8c$ shown in FIG. 25, much light is transmitted downward from the first titanium dioxide layer $8b$ below the mica grain $8a$, and especially when the pigment is used in a white background B, scattering light is generated at the interface between the first titanium dioxide layer $8b$ and the white background B, to adversely affect the interference light, not allowing the interference light with a specific wavelength to be obtained. However, in the brightening pigment, as shown in FIG. 24, stable reflected light is generated at the interface between the first titanium dioxide layer $8b$ and the low-valent titanium oxide layer $8c$, and interference light with specific wavelengths corresponding to the thicknesses of the respective layers $8b$, $8c$ and $8d$ can be obtained.

In the present invention, furthermore, various dispersions with the brightening pigment as a color ingredient are used for forming films and layers of various colors on the surfaces of various bases. For example, if a paint film is formed by using especially a diluted solution onto the surface of a light-transmitting base or a white base, the light transmitted through portions where the grains of the pigment do not exist and the light reflected from the surface of the base prevent the generation of interferene light for the same reason as stated above. Moreover, if the dispersion is applied onto a base with a rough or soft surface, very glossy various impressive colors which cannot be achieved by other pigments can be expressed, but the surface of the pigment film becomes rough to scatter incident light, not allowing the flip-flop effect to be exhibited sufficiently.

Therefore, the present invention which provides various exterior and interior laminates with the flip-flop effect containing the brightening pigment is intended to provide laminates with excellent reliability as fundamental materials as used for buildings, which adopt a base and structure to allow effective utilization of the coloring properties of the brightening pigment and are prevented from the deterioration of the brightening pigment and are higher in mechanical strength. Concretely, the present invention provides laminates with a paint film of the brightening pigment formed on a base, for example, a glass sheet or further with other paint films overlapped on the paint film or further with a light-intercepting protective film formed for preventing the adverse effect on the interference light, thereby sufficiently exhibiting the flip-flop effect in very stable colors.

Furthermore in the present invention, the base can be partially sandblasted or etched on the surface to receive incident light, to form diffusion regions free from coloring action, for more effectively expressing the flip-flop effect by design contrast.

The second object of the present invention is to provide fundamental materials as used for buildings artificially produced by using the brightening pigment, which give the decorative effect by a colored mirror surface.

In the general building industry, it is known to use a mirror formed by glass and a metallic film of aluminium, etc., for giving a feeling of wider interior space or for securing decorative interior brightness. The present invention gives a decorative effect of colors in addition to these conventional effects. It can be considered to use a conventional brightening pigment to achieve this object, but since the conventional brightening pigment can express only milky white color, the use of another color pigment is required, to lower the pigment properties such as weather resistance and the flip-flop effect. If a conventional non-brightening pigment is used, it excessively reflects the interior illumination, to lower the decorative effect. Thus, the second object of the present invention is to provide fundamental materials as used for buildings with new decorative effects incorporating a mirror surface with various color tones using, preferably, a brightening pigment only.

The third object of the present invention is to present a decorative effect with a profound feeling like natural rocks such as marble, i.e., an immitation effect. This can be achieved by forming a colored mirror surface as intended by the second object to express a natural profound surface like polished natural rocks, and effectively giving, for example, a marble pattern or spotted pattern. Since this kind of natural rocks are expensive, the use of the laminates of the present invention similar to natural rocks can reduce the cost.

The fourth object of the present invention is to provide laminates which can be used for natural illumination as well as for decoration. In the present invention, if a light-transmitting base is limited in the decorative region, it can be applied instead of window glass for natural illumination. In this case, if the properties of the brightening pigment, i.e., the selective absorption by the low-valent titanium oxides and the reflection by mica grains are used to effectively prevent the invasion of heat rays, an interior space comfortable mainly in summer can also be realized.

The fifth object of the present invention is to provide laminates with two decorative effects achieved by one laminate. In the present invention, at least two light-transmitting bases can be used to give different colors between the obverse side and the reverse side, for extending the applicable range of laminates.

DETAILED DESCRIPTION OF THE INVENTION

The laminates 1 stated in claims 1 to 6, excluding claim 2, of the present invention respectively use a light-transmitting base 1a which can be a sheet made of glass or resin, etc. On the other hand, the laminate 1 stated in claim 2 uses a light-intercepting base 1c which can be a sheet of ceramic or resin, etc.

Figure 21:
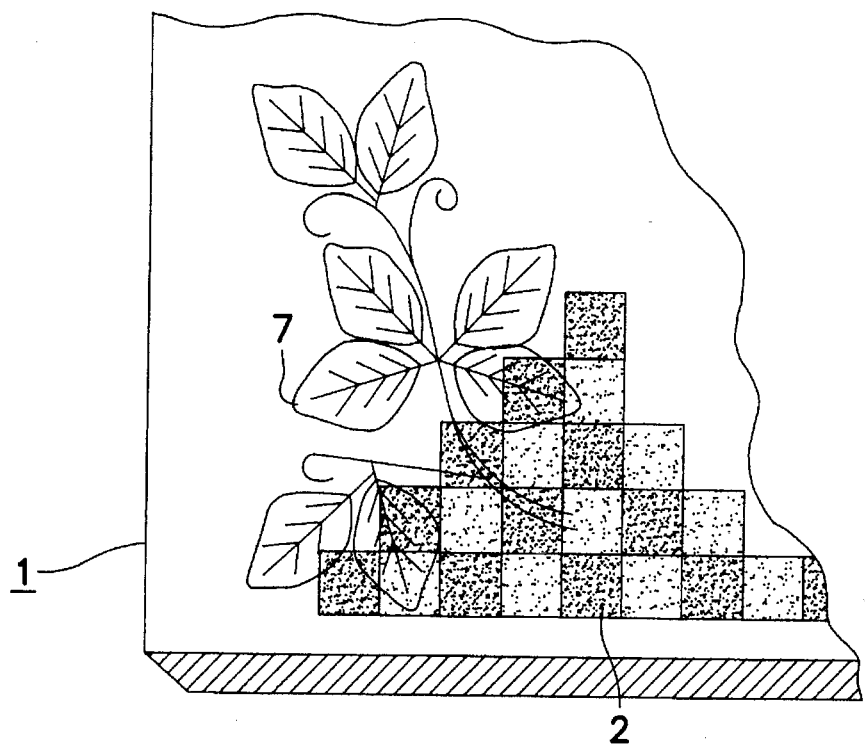
FIGS. 21 and 22 are views showing examples of the laminates of the present invention.
Figure 22:
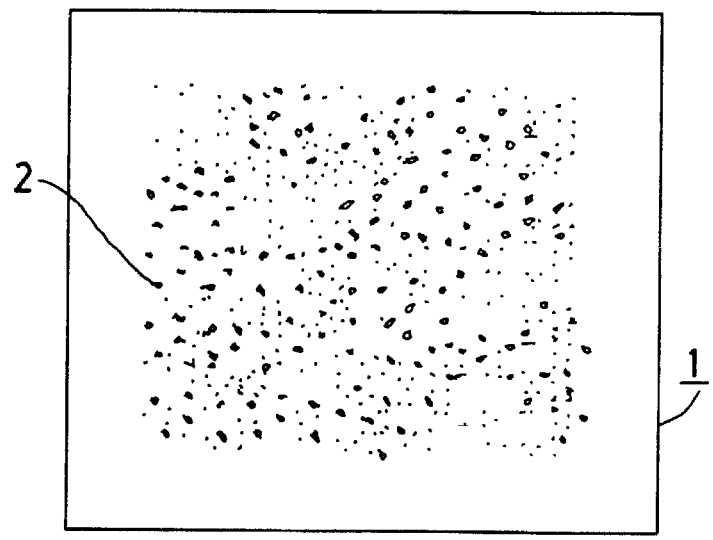
Figure 23:
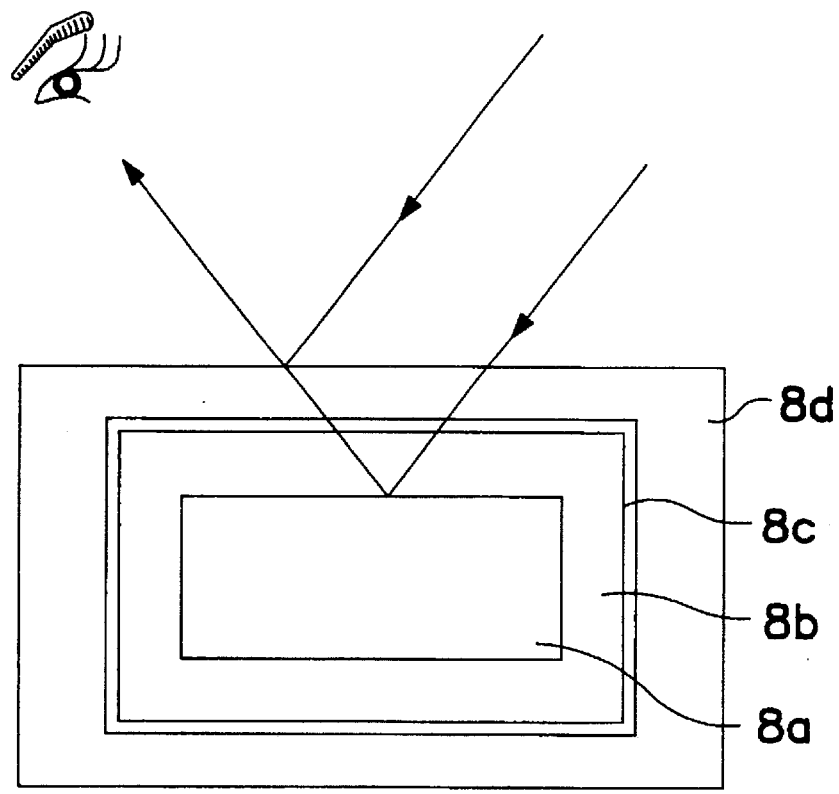
FIG. 23 is a view illustrating the principle of brightening pigment used for the decorative sheets of the present invention.
Figure 24:
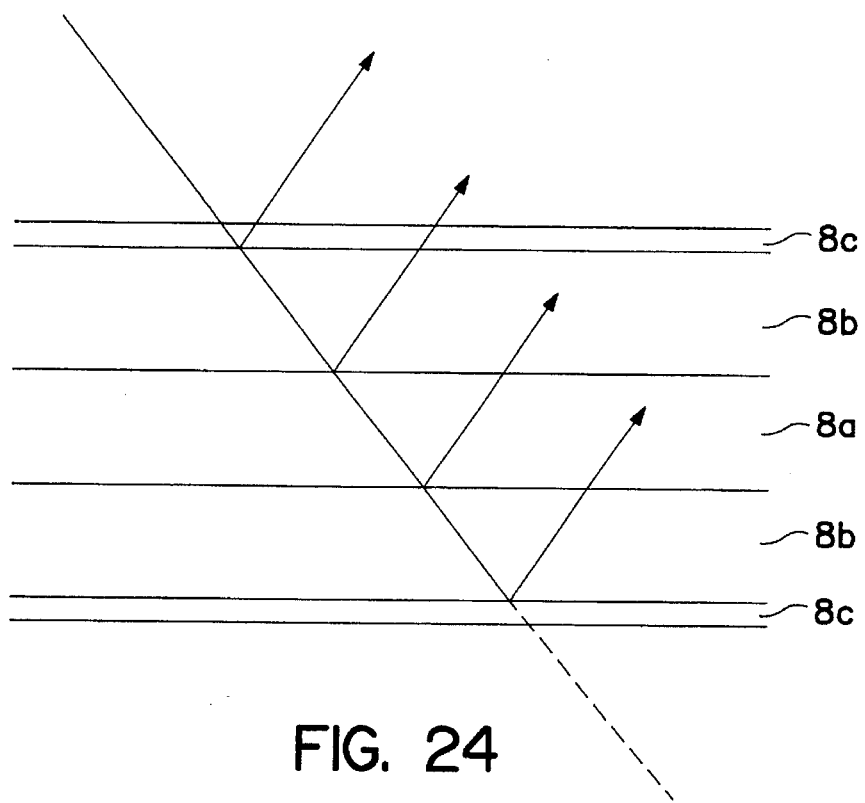
FIG. 24 is a view showing the principle of a brightening pigment used for the decorative sheets of the present invention.
Figure 25:
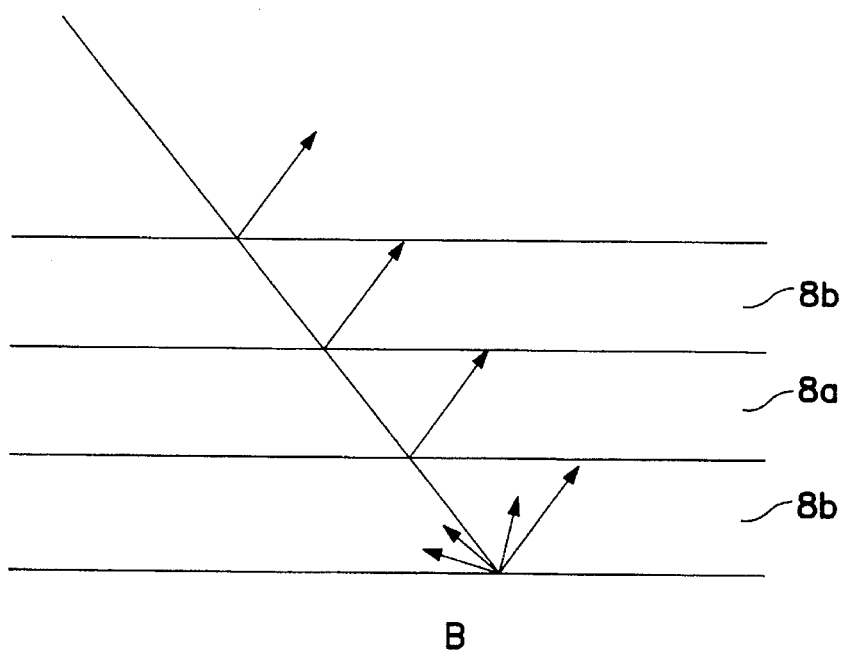
FIG. 25 is a view showing the principle of another pigment.

The laminates 1 stated in the respective claims of the present invention, preferably, use only a brightening pigment prepared by covering mica grains on their surfaces with titanium oxides including low-valent titanium oxides, without using any other pigment as the color component, for proper adjustment in saturation, lightness, hue, etc. In this case, such excellent properties as safety, stability, light resistance, acid resistance, alkali resistance, solvent resistance and heat resisance of the brightening pigment are not deteriorated, since any other color pigment such as iron oxide, Prussian blue, chromium oxide or carbon black is not mixed, and the laminate 1 obtained presents the flip-flip effect with very stable colors and dreamy pattern, for example, as shown in FIGS. 21 and 22. However, especially when it is intended to give any other decorative effect, a layer containing another pigment can also be formed as described in the examples given later.

Figure 1:
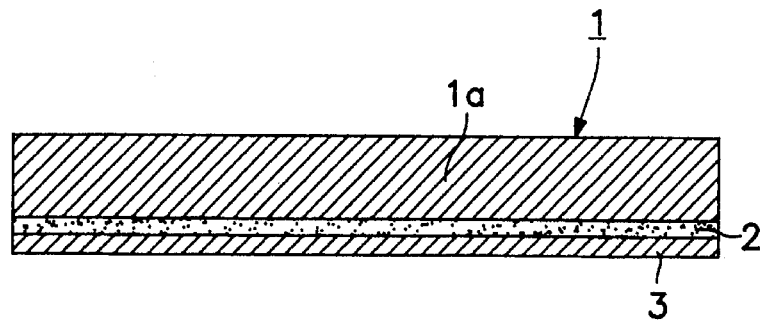
FIGS. 1–3 are sectional views respectively showing a laminate of the present invention.
Figure 2:
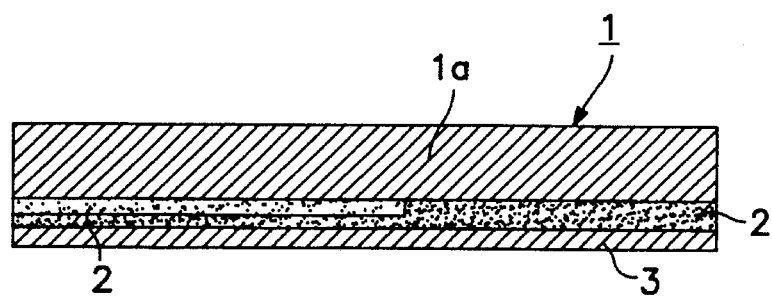
Figure 3:
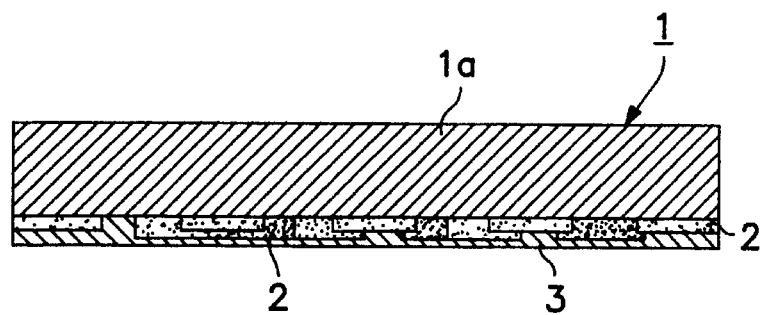

FIGS. 1 to 3 are sectional views respectively showing a laminate 1 using a light-transmitting base 1a stated in claim 1.

The laminate 1 according to claim 1 of the present invention is, as shown in FIG. 1, composed of a paint film 2 on a light transmitting base 1a and a light-intercepting protective film 3 on the paint film 2, and the paint film 2 contains a brightening pigment prepared by covering mica grains on the surfaces with titanium oxides including low-valent titanium oxides.

The method for forming the laminate 1 with the light-transmitting base 1a stated in claim 1 of the present invention is described below. This method can be applied to any laminate 1 with the paint film 2, i.e., any other laminates than that stated in claim 3.

To form the laminate 1 of the present invention, the light-transmitting base 1a such as a glass sheet is coated, on the side intended to be used for decoration, partially or entirely with a dispersion containing a brightening pigment prepared by covering mica grains on the surfaces with titanium oxides including low-valent titanium oxides, to form the paint film 2.

The dispersion of a brightening pigment used here is a paint with a properly colored brightening pigment dispersed into a vehicle containing an anchoring material, i.e., a solution containing an anchoring material such as fatty oily, resin wax or sizing material and auxiliary ingredients such as a solvent, viscosity regulator, surfactant, drying regulator and antiseptic. The dispersion or its diluted Solution is applied onto one side of the base 1a by a spray coater, etc., to form the paint film 2, and the paint film 2 is dried and cured at least on the film surface. Subsequently, a paint containing another pigment or dye, etc. is applied onto the paint film 2 or the coated side of the base 1a including the paint film 2, to form the light-intercepting protective film 3.

To achieve a shade or color-mixed or multi-color pattern, as shown in FIG. 2, in the first step of decoration, the base 1a is coated, on the side intended to be decorated, with the dispersion containing the brightening pigment prepared by covering mica grains on the surfaces with titanium oxides including low-valent titanium oxides, to form the paint film 2 and in the second step or subsequent plural steps, films similar to the paint film 2 are formed repeatedly at proper regions for overlapping.

Furthermore, to express a profound feeling like natural rocks, especially a visual design like rock grains, as shown in FIG. 3, in the first step of decoration, the base 1a is coated, on the side intended to be decorated, with the dispersion containing the brightening pigment prepared by covering mica grains on the surfaces with titanium oxides including low-valent titanium oxides, to form the paint film 2 in proper coloring and dots at proper intervals, and in the second step or subsequent plural steps, after the paint film 2 has been dried and cured at least on the film surface over time, the disperison containing the brightening pigment is applied to form films similar to the paint film 2 repeatedly as dots over the regions not coated with the paint film and over the paint film 2 around the non-coated regions, for overlapping.

How the laminate 1 of claim 1 of the present invention is used and how it functions are described below. This usage is applicable also to the laminates 1 with the light-transmitting base 1a of the respective claims, excluding that of claim 2.

The laminate 1 is used with the side without any paint film 2 of the base 1a exposed to human observation. In this case, the side exposed to human observation of the base 1a receives incident light, and the protective film 3 on the paint film 2 prevents the interference of light from the background which otherwise affects the coloring of the brightening pigment, and prevents the peeling of the paint film 2 for protection.

When the paint film 2 is formed by using a diluted dispersion, the color of the protective film 3 can be observed through the portions where the grains of the brightening pigment do not exist, and so the complementary color of the protective film 3 gives delicate color mixture effect. Furthermore, if the protective film 3 is formed by using a non-brightening pigment, the color of the protective film 3 does not change, and in this case, the flip-flop effect of the brightening pigment is given with the color of the protective film 3 kept constant in tone, to present a profound atmosphere. If the protective film 3 has a color of absorbing certain light such as black, it cannot happen that the generation of interference light with a specific wavelength by the brightening pigment is inhibited by the light reflected from the protective film 3.

The laminate 1 shown in FIG. 3 forms a rock-grained pattern as shown in FIG. 22, and gives a colored mirror face on one side due to the brightening pigment, thus providing a decorative effect with a profound feeling similar to natural rocks.

Figure 4:
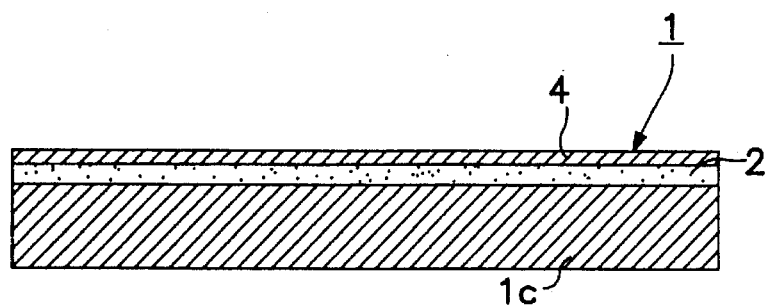
FIGS. 4–6 are sectional views respectively showing a laminate of the present invention.
Figure 5:
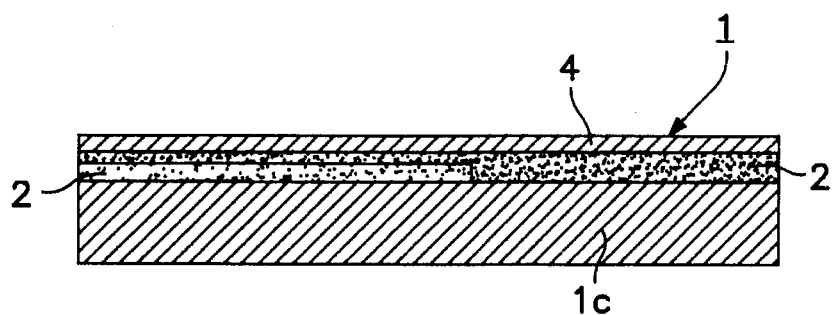
Figure 6:
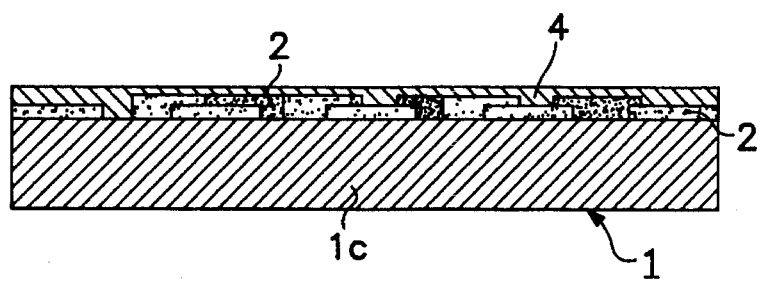

FIGS. 4 to 6 are sectional views respectively showing a laminate 1 using a light-intercepting base 1c stated in claim 2.

The laminate 1 stated in claim 2 of the present invention is, as shown in FIG. 4, composed of a paint film 2 on the light-intercepting base 1c and a light-transmitting protective film 4 on the paint film 2, and the paint film 2 contains a brightening pigment prepared by covering mica grains on the surfaces with titanium oxides including low-valent titanium oxides.

The method for forming the laminate 1 using the light-intercepting base 1c stated in claim 2 of the present invention is almost the same as described for claim 1, and the usage is different in that the light-transmitting protective film 4 of the laminate 1 is exposed to human observation. In this case, the light-transmitting protective film 4 receives incident light, and so the scattering of incident light is prevented. The light-transmitting protective film 4 functions to prevent the peeling of the paint film 2 for protection, and in the case of the colored protective film 3, it can also be used as a film face for color mixture with the brightening pigment.

FIGS. 7 to 10 are sectional views respectively showing a laminate 1 using light-transmitting bases 1a and 1b stated in claim 3 of the present invention.

Figure 7:
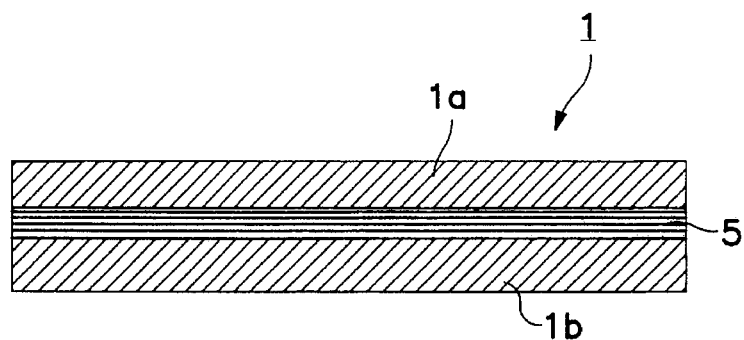
FIGS. 7–10 are sectional views respectively showing a laminate of the present invention.

The laminate 1 stated in claim 3 of the present invention is, as shown in FIG. 7, composed of a first light-transmitting base 1a, an intermediate resin layer 5 on the first base 1a, and a second light-transmitting base 1b on the intermediate resin layer 5, and the intermediate resin layer 5 contains a brightening pigment prepared by covering mica grains on the surfaces with titanium oxides including low-valent titanium oxides.

The method for forming the laminate 1 using the transmitting bases 1a and 1b stated in claim 3 of the present invention is described below. The following method can also be used for forming the laminate 1 stated in claim 4, since the intermediate resin layer 5 can be formed using a liquid resin.

The laminate 1 according to claim 3 of the present invention has at least two light-transmitting bases 1a and 1b bonded through the intermediate resin layer 5. At first, a frame made of a sealant with a certain thickness and with injection holes for injecting a liquid resin (not illustrated) is formed to correspond to the edges of the bases 1a and 1b, and the bases 1a and 1b are bonded through the frame, to form a slight clearance corresponding to the thickness of the frame between the opposite faces of the bases 1a and 1b. Then, a liquid resin is injected into the clearance through the injection holes, to form the intermediate resin layer 5 between the bases 1a and 1b.

The liquid resin can be selected from colorless transparent or colored transparent consistent liquids of acrylic resins, silicone based resins, polyester based resins, polyurethane based resins, polycarbonate based resins, polyimide based resins, etc. The liquid is hardened with the lapse of time, to form a solid layer between the first and second bases 1a and 1b.

In the laminate 1 stated in claim 3 of the present invention, depending on the specific gravities of the pigment and the liquid resin, it can happen that when the liquid resin is hardened, the brightening pigment is dispersed into the liquid resin as a whole during hardening or mainly settle downward, to form a decorative layer. These phenomena can be selectively used to obtain the respectively intended effects.

Moreover, if the brightening pigment prepared by covering mica grains on the surfaces with titanium oxides including low-valent titanium oxides and another brightening or non-brightening pigment almost equal in specific gravity to the brightening pigment are mixed in the setting liquid resin, the coloring of the brightening pigment can be enjoyed with the color of the other pigment generally kept constant.

Figure 8:
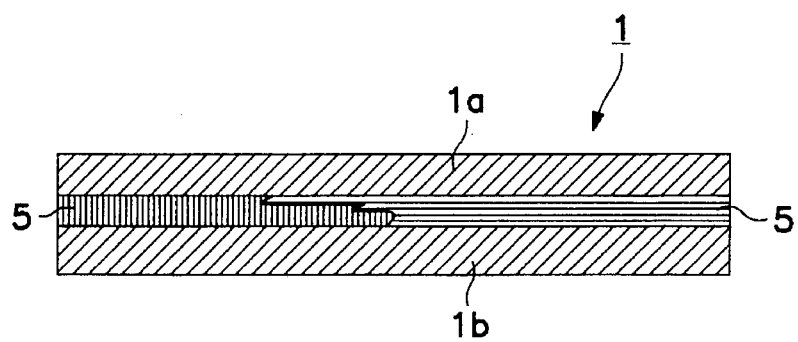

The laminate 1 shown in FIG. 8 has a structure to give a shade like marble pattern or multi-color pattern. At first, several brightening pigments different in the wavelength of interference light are mixed respectively with different lots of a liquid resin, and the respective liquid resins are injected from the injection holes of the frame. In this case, if the liquid resins are injected almost simultaneously from the respective injection holes of the frame, the liquid resins are partially overlapped, and a marble pattern is formed after completion of hardening. If another brightening or non-brightening pigment is mixed with the liquid resin in addition to the several brightening pigments different in the wavelength of interference light, the characteristics of the respective pigments different in coloring action give a pattern with emphasized contrast.

Figure 9:
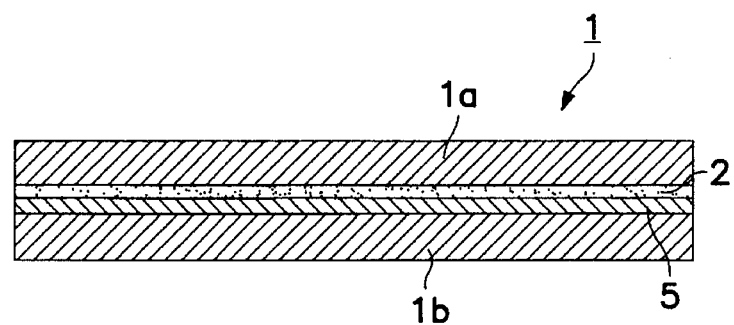
Figure 10:
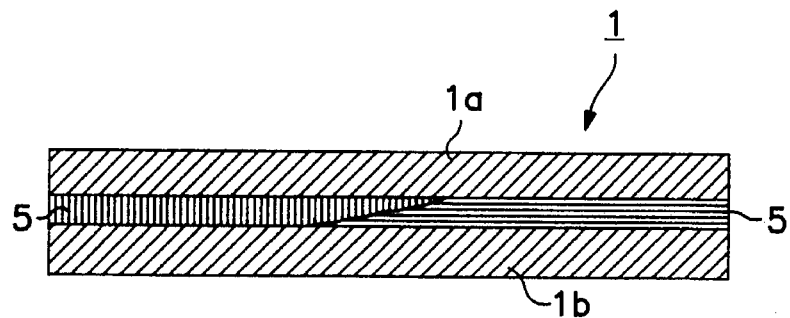

The laminates 1 of FIGS. 9 and 10 are different in color between obverse and reverse sides and intended to be used as interior partitions. In this case, the brightening pigment prepared by covering mica grains on the surfaces with titanium oxides including low-valent titanium oxides and another pigment different in specific gravity from the brightening pigment are mixed with a liquid resin, and the liquid grain is injected through the injection holes into the clearance formed between the opposite faces of the bases 1a and 1b, to form a decorative layer. Subseqently the injection holes are closed, and the bases 1a and 1b are kept horizontally. With the lapse of time, the brightening pigment and the other pigment are dispersed in the thickness direction of the liquid resin. With further lapse of time, the liquid resin is hardened to form the intermediate resin layer 5. Thus, as shown in FIG. 9, a decorative layer different in color between both sides can be formed. As another method, if the bases 1a and 1b are kept inclined after closing the injection holes, the brightening pigment and the other pigment are dispersed in the thickness and width directions of the liquid resin with the lapse of time. Thus, as shown in FIG. 10, a decorative layer different in color region between both sides can be formed.

Figure 11:
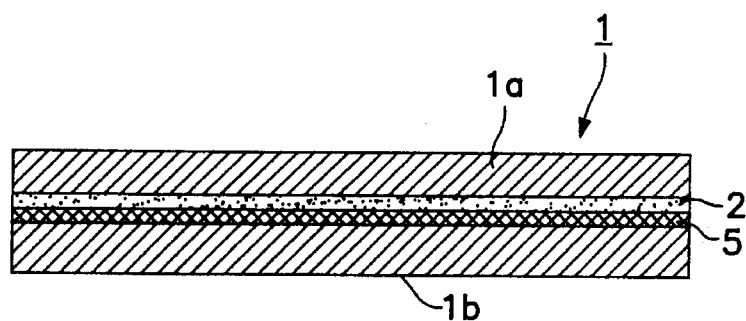
FIGS. 11–13 are sectional views respectively showing a laminate of the present invention.
Figure 12:
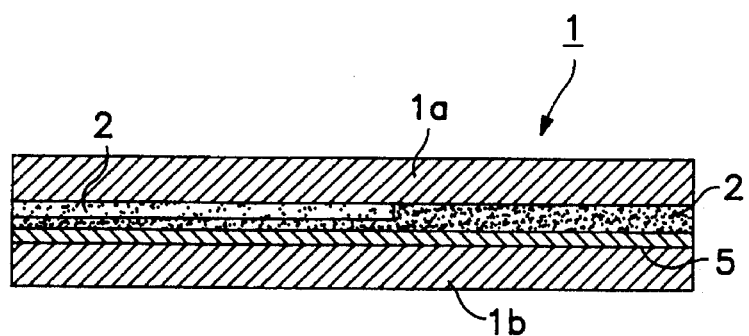
Figure 13:
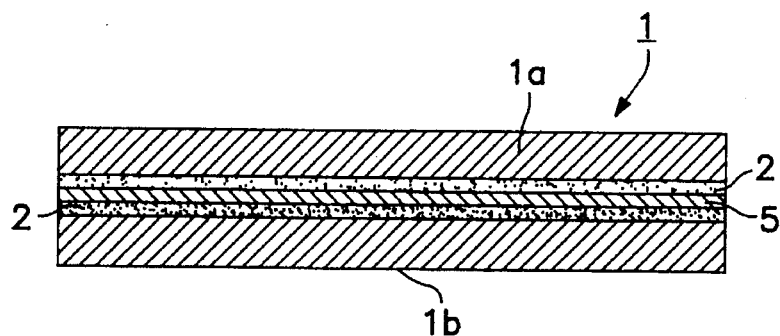

FIGS. 11 to 13 are sectional views respectively showing a laminate using light-transmitting bases 1a and 1b stated in claim 4.

The laminate 1 stated in claim 4 of the present invention is, as shown in FIG. 11, composed of a first light-transmitting base 1a, a paint film 2 on the first base 1a, an intermediate resin layer 5 on the paint film 2, and a second light-transmitting base 1b on the intermediate resin layer 5, and the paint film 2 contains a brightening agent prepared by covering mica grains on the surfaces with titanium oxides including low-valent titanium oxides.

The laminate 1 stated in claim 4 is similar to the laminate 1 of claim 1 in the formation of the paint film 2, and similar to the laminate 1 of claim 3 in the formation of the intermediate resin layer 5. If the laminate 1 of claim 4 is compared to the lamnate 1 of claim 3, it is not necessary to consider the dispersibility of the brightening pigment into the solvent, etc. since the pigment is not dispersed into the liquid resin, and the intermediate resin layer 5 formed by a liquid resin, etc. can be used for color mixture. On the other hand, if compared to the laminate 1 of claim 1, the laminate is excellent in mechanical strength.

To form the laminate 1, the paint film 2 is formed on one side of the first base 1a or the second base 1b, and after the paint film 2 has been dried and cured at least on the film surface, the respective bases 1a and 1b are held with a certain clearance formed between them, with the paint film 2 turned toward the intermediate resin layer 5 side, while a frame with injection holes is formed between the bases 1a and 1b at portions corresponding to their edges. A liquid resin is injected from the injection holes and hardened over time, to be firmly bonded to the bases 1a and 1b. Instead of the liquid resin, a resin film of polyvinyl butyral can also be used for bonding.

Furthermore, as shown in FIG. 12, other paint films 2 may be overlapped for achieving a shade or color-mixed or multi-color pattern.

In FIG. 13, paint films 2 are formed on the respective sides turned toward the intermediate resin layer 5, of the first base 1a and the second base 1b, and overlapped through the intermediate resin layer 5, to give a shade or color-mixed or multi-color pattern observed at a certain angle.

Figure 16:
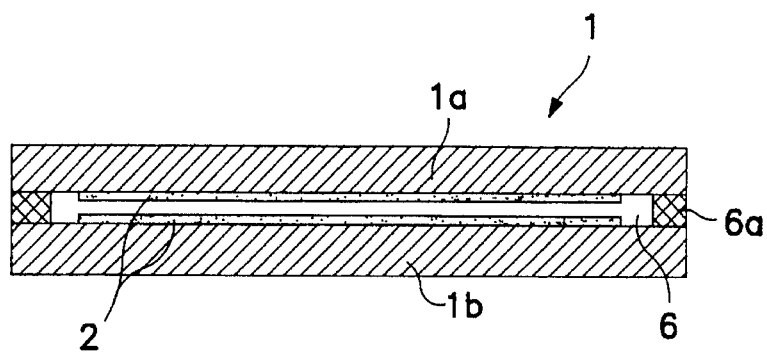
Figure 17:
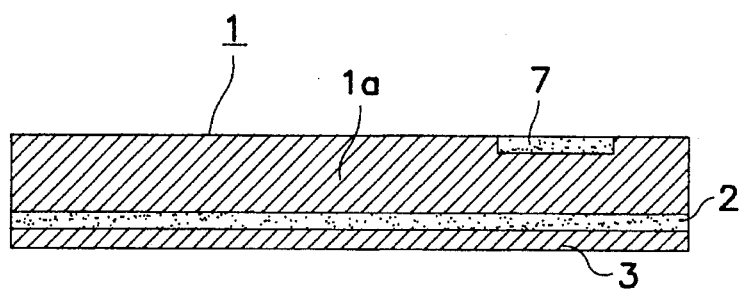
FIGS. 17–20 are sectional views illustrating a laminate of the present invention.
Figure 18:
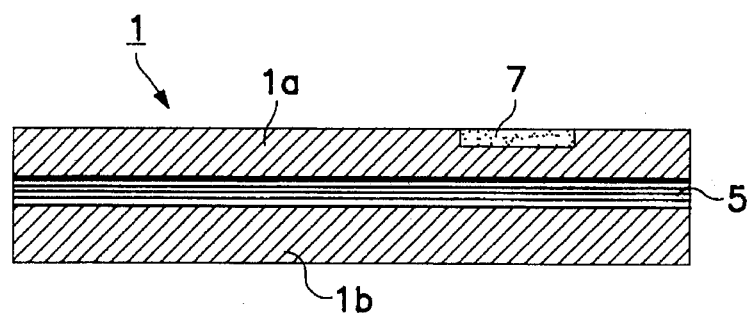
Figure 19:
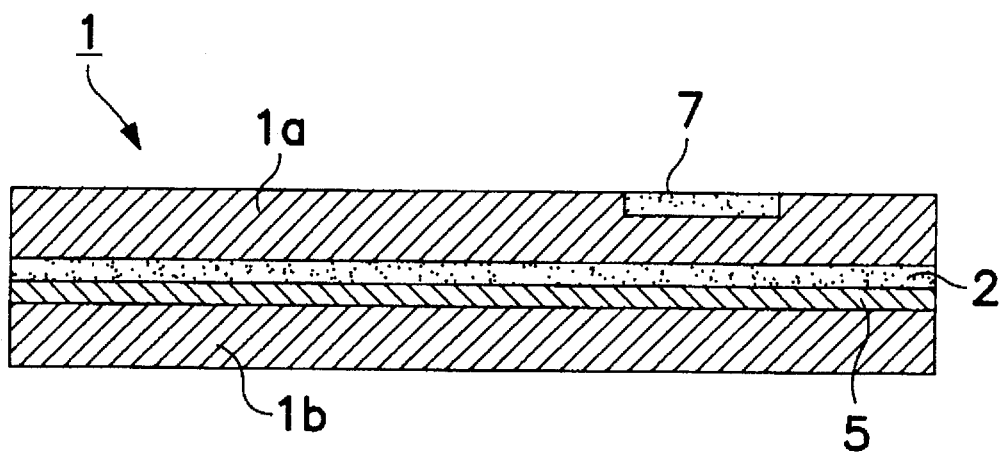
Figure 20:
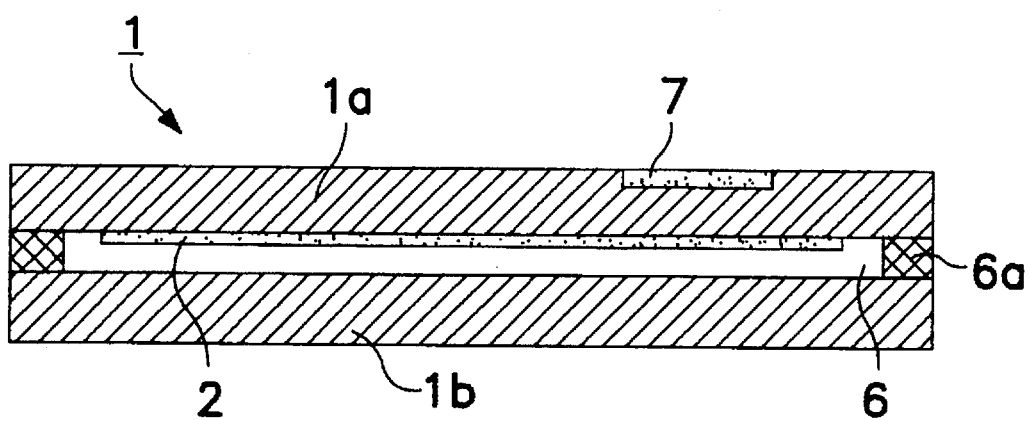

In this case, as in the case of FIG. 16 illustrating claim 5 described later, the usage can be dynamic.

Since the respective paint films 2 overlapped are kept apart from each other through the intermediate resin layer 5, the combination of the paint films 2 as a complete set gives a pattern shifting according to the change of view point, and so in addition to the flip-flop effect of the brightening pigment, the dynamic change in color and form according to the shift of view point can be enjoyed.

Figure 14:
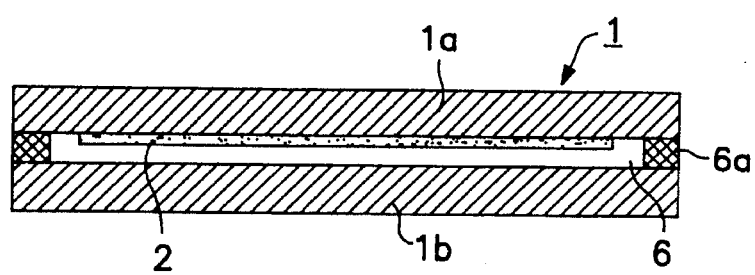
FIGS. 14–16 are sectional views respectively showing a laminate of the present invention.
Figure 15:
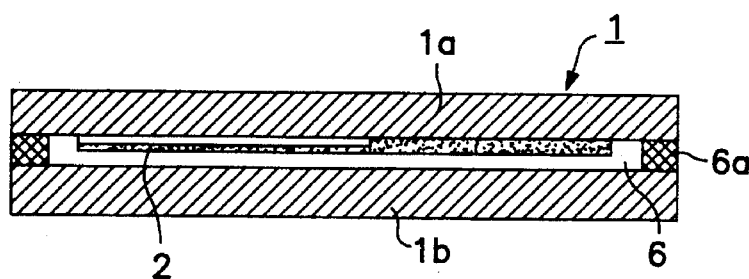

FIGS. 14 to 16 are sectional views respectively showing a laminate 1 using light-transmitting bases 1a and 1b stated in claim 5 of the present invention.

The laminate 1 stated in claim 5 of the present invention is, as shown in FIG. 14, composed of a first light-transmitting base 1a, a paint film 2 on the first base 1a and a second light-transmitting base 1b through an intermediate air layer 6 on the paint film 2, and the paint film 2 contains a brightening pigment prepared by covering mica grains on the surfaces with titanium oxides including low-valent titanium oxides.

The laminate 1 stated in claim 5 is similar to the laminate 1 of claim 1 since it has the paint film 2, but since it has the intermdiate air layer 6 between the bases 1a and 1b, it is soundproof and heat-insulating. Furthermore, if a desiccant is provided in a spacer 6a for internally drying the intermediate air layer 6 or if the atmosphere is substituted by any gas, the durability of the paint film 2, etc. can be enhanced.

To form the laminate, the paint film 2 is formed on one side of the first base 1a or the second base 1b, and after the paint film 2 has been dried and cured at least on the film surface, the spacer 6a of butryl rubber, etc. packed with a desiccant is provided between the bases 1a and 1b at portions corresponding to their edges, for bonding them. Furthermore, as required, a sealant (not illustrated) may be provided around the spacer 6a.

In the laminate 1, as shown in FIG. 15, plural paint films 2 may be overlapped to achieve a shade or color-mixed or multi-color pattern, or as shown in FIG. 16, plural paint films 2 may be formed through the intermediate air layer 6, to achieve a shade or color-mixed or multi-color pattern.

FIGS. 17 to 20 are sectional views respectively showing a laminate using light-transmitting bases 1a and 1b stated in claim 6 of the present invention.

The laminate 1 using the light-transmitting base 1a of the present invention can be designed to partially highlight the coloring by the brightening pigment. FIGS. 17 to 20 show laminates 1 suitable for exhibiting this decorative effect.

These laminates 1 are partially sandblasted or etched on the surface of the base 1a receiving incident light, to form diffusion regions 7 such as geometric or other patterns, so that scattered light to the interior illumination is generated to inhibit interference light, for improving the decorative effect of the brightening pigment by contrast.

The brightening pigment prepared by covering mica grains on the surfaces with titanium oxides including low-valent titanium oxides used in the present invention is not especially limited, but as the case may be, the surfaces of the grains may be improved in nature for enhancing dispersion stability to exhibit a more beautiful color tone and pearly gloss.

The grain surfaces of the new brightening pigment can be improved as done for improving the grain surfaces of general color and other pigments.

The grain surfaces of the new brightening pigment can be improved, for example, by a silicone selected from chain polysiloxanes such as dimethylpolysiloxane, methylphenylpolysiloxane and methylhydrogenpolysiloxane, cyclic polysiloxanes such as decamethylpolysiloxane, dodecamethylpolysiloxane and tetramethyltetrahydrogenpolysiloxane, and silicon resins and silicone rubbers with or capable of forming three-dimensional network structure.

Furthermore, they can be improved also by lipophilic nonionic, hydrophilic nonionic, anionic and cationic surfactants, natural or synthetic high polymers, inorganic high polymers, polyhydric alcohols, higher alcohols, higher fatty acids, metal soap, etc.

Examples for improving the grain surfaces of the new brightening pigment are described below, but the present invention is not limited thereto or thereby.

IMPROVEMENT EXAMPLE 1

Five kilograms of a new brightening pigment prepared by covering mica grains on the surfaces by titanium oxides including low-valent titanium oxides to cause coloring by the intererence action of light (hereinafter called the new brightening pigment) was put into a double cone type reactor, and nitrogen gas was introduced into it. It was heated to 80° C. With the nitrogen atmosphere and temperature kept, gaseous 1,3,5,7-tetramethylcyclotetrasiloxane (hereinafter abbreviated as H4) was supplied into the reactor with nitrogen gas as a carrier. Six hours later, the supply of H4 was stopped, to terminate the reaction. To remove the excessive H4 existing in the reactor and on the surfaces of the new brightening pigment grains, the reaction produce was dried at 120° C. for 2 hours while nitrogen gas was supplied. It was allowed to cool, and the supply of nitrogen gas was stopped, to obtain a brightening pigment improved by H4. The obtained brightening pigment was not wetted by water, i.e., was hydrophobic, and showed very stable dispersibility in organic solvents such as ethyl acetate, toluene and acetone.

IMPROVEMENT EXAMPLE 2

Four kilograms of the new brightening pigment was put into a 90-liter reactor, and 20 g of stearyltrimethylammonium chloride was dissolved into 10 liters of ion exchange water. The solution and 70 liters of ion exchange water were supplied into the reactor, and stirred by a screw propeller, to homogeneously disperse the new brightening pigment. With stirring, the liquid was heated to 50° C., and allowed to stand for 3 hours with stirring. It was allowed to cool and filtered, and the residue was washed by water and dried at 105° C. for 16 hours, to obtain a brightening pigment improved by a surfactant. The improved brightening pigment was dry, not being little cohesive and exhibited a beautiful color tone of pearly high gloss.

IMPROVEMENT EXAMPLE 3

Five kilograms of the new brightening agent was put into a 150-liter reactor, and 100 liters of an aqueous solution with caustic soda dissolved in it was added. The mixture was stirred by a screw propeller, to homogeneously disperse the new brightening pigment. The dispersion was 9.5 in pH. It was heated to 90° C., and with stirring, and 0.2 mole/liter of hydrochloric acid aqueous solution and 10 liters of 0.1 mole water glass aqueous solution were simultaneously added dropwise at a rate of 100 ml per minute with pH kept at 9.5. After completion of dropwise addition of water glass aqueous solution, the mixture was kept heated and stirred, for being allowed to stand further 2 hours. It was allowed to cool and filtered, and the residue was washed by water and dried at 105° C. for 16 hours, to obtain a brightening pigment improved by an inorganic high polymer. The improved brightening pigment was good in dispersion stability in water and exhibited a more beautiful color tone of pearly gloss as a water paint.

PRESENT INVENTION EXAMPLE 1

Two 5 mm thick light-transmitting glass sheets and a liquid resin with a pigment dispersed were used to form a 300 mm wide×300 mm long×11 mm thick laminate composed as stated in claim 3. The flip-flop effect was visually observed by 20 experts. In a room with a window on the north;, the change of the color was observed using diffused light of 2000 luxes (digital illumination meter IM-3 produced by Topcon) as the light source, by changing the incident angle. The result of evaluation is shown in Table 1.

TABLE 1

|  | Brightening pigment of present invention | Conventional brightening pig. | Non-brightening pigment |
| --- | --- | --- | --- |
| Flip-flop effect | o | x | x | o: Color sufficiently changed.
Δ: Color slightly changed.
x: Color did not change.

To examine the decorative effect with a color added, a clear lamp (type L110V-60W) was used to observe its reflected image. The result is shown in Table 2

TABLE 2

|  | Brightening pigment of present invention | Conventional brightening pig. | Non-brightening pigment |
| --- | --- | --- | --- |
| Decorative effect with color added | o | Δ | x | o: Reflective light changed in color.
Δ: Reflective light slightly changed in color.
x: Reflective light did not change in color.

Thus, the laminate of the present invention was confirmed to be very execellent in the respective effects.

EFFECT OF THE INVENTION

The laminates of the present invention has a layer containing a brightening pigment prepared by covering mica grains on the surfaces with titanium oxides including low-valent titanium oxides. So, they can express various colors with gloss like soap bubbles and butterfly alae, and also have the flip-flop effect and the decorative effect of colored mirror face. Thus, they can provide new atmospheres with a profound feeling in interior spaces.

Furthermore, the laminates of the present invention can also be used for such purposes as not only decoration but also natural illumination, and are excellent in durability. If they are designed to imitate marble, etc. as substitutes for natural rocks, the building cost can be remarkably reduced. Thus, the present invention is very significant.

We claim:

1. A laminate for use as a building construction material consisting of a light-transmitting base, a paint film on the base, and a black light-intercepting and absorbing protective film on the paint film, wherein the paint film comprises a dispersion of mica grains with only layers of titanium oxide coated on the surfaces of the mica grains and said layers of titanium oxide comprises at least one layer of a low-valent titanium oxide and the remainder of the layers being titanium dioxide.

* * * * *